No. 697,031. Patented Apr. 8, 1902.
C. W. SNOOK.
FENCE POST.
(Application filed Oct. 3, 1901.)
(No Model.)
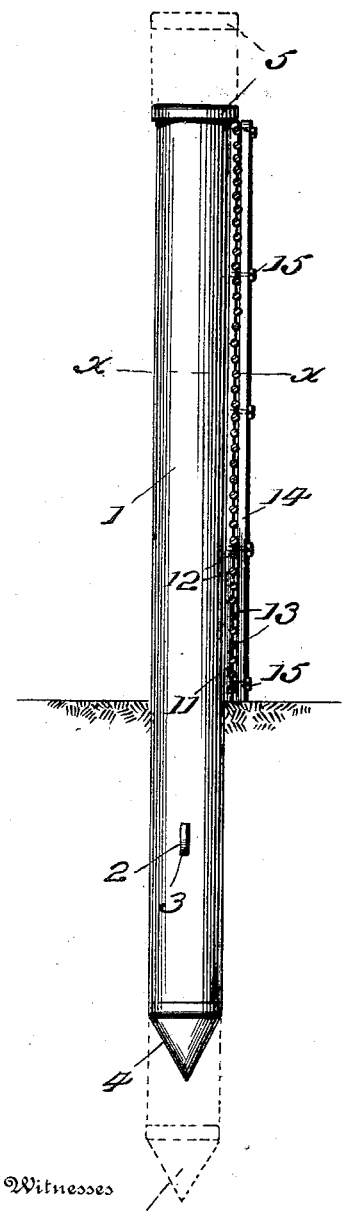
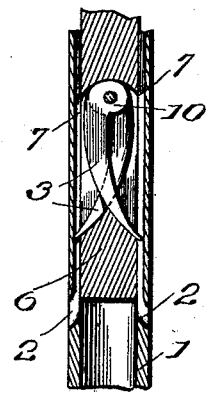
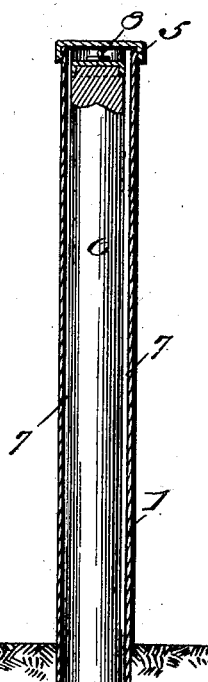
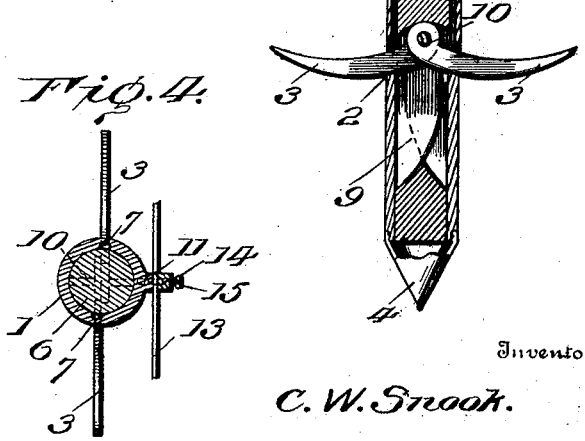
Inventor
C. W. Snook.

UNITED STATES PATENT OFFICE.

CHARLES W. SNOOK, OF CLARKSVILLE, OHIO.

FENCE-POST.

SPECIFICATION forming part of Letters Patent No. 697,031, dated April 8, 1902.

Application filed October 3, 1901. Serial No. 77,491. (No model.)

*To all whom it may concern:*

Be it known that I, CHARLES W. SNOOK, a citizen of the United States, residing at Clarksville, in the county of Clinton and State of Ohio, have invented certain new and useful Improvements in Fence-Posts; and I do hereby declare the following to be a full, clear, and exact description of the invention, such as will enable others skilled in the art to which it appertains to make and use the same.

Fence-posts as generally constructed and planted in the ground become loosened in winter-time by the action of the frost and require to be reset or plumbed.

This invention combines with a fence-post novel means for positively securing it in the ground and which will admit of the anchorage being withdrawn should it be desired at any time to remove the post.

The invention consists of a tubular post having lateral openings in its sides near its lower end, grooves in the inner walls of the post leading from the upper end to the said openings, a rod slidable within the post, and spurs carried by the said rod and adapted to be projected through the openings of the post.

The invention further consists of the novel features, details of construction, and combination of parts, which hereinafter will be more fully described and claimed, and shown in the drawings, in which—

Figure 1 is a side view of a fence-post embodying the invention, the dotted lines indicating the removability of the cap and point. Fig. 2 is a vertical central section showing the spurs projected. Fig. 3 is a sectional detail, on a larger scale, showing the relation of the spurs to the grooves and lateral openings when the said spurs are located wholly within the post. Fig. 4 is a cross-section on the line X X of Fig. 1.

Corresponding and like parts are referred to in the following description and indicated in all the views of the drawings by the same reference characters.

The post 1 is tubular and is provided with lateral openings 2 near its lower end, said openings being arranged at diametrically opposite points and being vertically elongated to correspond with the outline of the spurs 3 near their pivotal ends. The openings 2 curve outwardly and downwardly to admit of the spurs passing therethrough with a minimum amount of resistance. The post is preferably designed to be driven into the ground and for this purpose is pointed at its lower end, as shown at 4, said point 4 being solid and having detachable connection with the post, preferably by means of a screw-joint. The upper end of the post is closed by a cap 5, fitted thereto by a screw-thread joint, so as to be readily removable when desired to gain access to the interior of the post for the removal or insertion of the rod 6. Guide-grooves 7 are formed in the inner walls of the post 1 at diametrically opposite points and extend from the upper end of the post to the lateral openings 2, and these grooves are designed to receive the points of the spurs 3, so as to direct them to the openings 2, in which they are projected by engagement with the lower ends of the openings 2 and the force applied to drive the rod 6 to the limit of its downward movement within the post 1.

The rod 6 may be tubular or solid and is provided at its upper end with a ring 8 for the reception of a lever, pry, or other instrument for forcibly withdrawing the rod when it is required to remove it from the post 1. An opening or slot 9 is provided in the rod 6 near its lower end and receives the spurs 3, which are pivotally connected at their upper ends to the rod at the upper end of the opening 9. The pivotal ends of the spurs 3 are made rounding, and the upper end of the opening 9 is of corresponding form to admit of a close joint being formed between the pivotal ends of the spurs and the rod, whereby the force of the blows delivered upon the rod to drive it home within the post is relieved from the pivotal connection 10 between the spurs and the said rod. The spurs 3 are curved and tapered throughout their length, and they are arranged within the rod 6, so that their points will project a slight distance beyond the sides of the rod, so as to enter the guide-grooves 7, this being essential to direct the spurs to the lateral openings 2 and to cause their points to come in contact with the lower ends of the openings 2, whereby the spurs are caused to project through said openings as the rod 6 is forced home within the post.

The post is planted or secured in the ground in any desired way, preferably by being driven therein, and when it is made secure the rod 6 is inserted, care being observed to have the projecting points of the spurs 3 enter the guide-grooves 7. When the points of the spurs reach the openings 2 and come in contact with the outwardly and downwardly curved ends of the openings 2, the further descent of the spurs is arrested, and as the rod 6 is forced down into the post by delivering blows thereon or in any desired way the spurs are caused to pass outward through the openings 2 and enter the ground and form a secure anchorage for the post, so as to prevent its withdrawal. Should it be required to remove the post, the spurs are withdrawn from the post by an upward pull upon the rod 6, after which the post can readily be extracted by an upward pull thereon through the instrumentality of a suitable pry, as will be readily comprehended. A strip 11 is provided at one side of the post 1 and may be an integral part thereof or fastened thereto, and this strip has a series of notches 12 in its outer side to form seats for the fence-wires 13. A clamp-strip 14 is provided to hold the fence-wires 13 in the seats or notches 12, and this strip is set up by means of clamp-screws or fastenings 15. In the event of the notched strip 11 being separate from and attached to the post 1 the clamp-screws or fastenings 15 may be utilized for securing the said strip to the post, thereby obviating the employment of other means.

Having thus described the invention, what is claimed as new is—

A tubular post having oppositely-disposed lateral openings near its lower end and having inner guide-grooves leading from the top to the upper ends, only, of the said lateral openings, a driving-point detachably fitted to the lower end of the post, a rod insertible within the post and having a slot near its lower end, anchoring-spurs located within the said slot and having their upper ends overlapped and pivoted together and to the rod by the same pivot-fastening, the upper ends of the spurs being made rounding to obtain a bearing against the upper end of the slot, and the points of the spurs normally projecting beyond the sides of the rod to enter and travel in the aforesaid guide-grooves and limited in their inward movement by a portion of the rod at the lower end of the slot, and a cap for closing the upper end of the post and the upper ends of the said guide-grooves, substantially as described.

In testimony whereof I affix my signature in presence of two witnesses.

CHARLES W. SNOOK. [L. S.]

Witnesses:
LOAMI R. HALE,
S. W. HULS.